United States Patent
Cooper et al.

(10) Patent No.: US 7,860,780 B1
(45) Date of Patent: Dec. 28, 2010

(54) SYSTEM AND METHOD FOR PROCESSING TRADING ORDERS TO PROVIDE "NEGOTIATE IN THE MIDDLE" CAPABILITY

(75) Inventors: Steven Cooper, Rumson, NJ (US); William Riggio, Basking Ridge, NJ (US); Geoffrey Bernard, Manhasset, NY (US)

(73) Assignee: ICAP Services North America LLC, Jersey City, NJ (US)

( * ) Notice: Subject to any disclaimer, the term of this patent is extended or adjusted under 35 U.S.C. 154(b) by 40 days.

(21) Appl. No.: 11/700,038

(22) Filed: Jan. 31, 2007

(51) Int. Cl.
*G06Q 40/00* (2006.01)

(52) U.S. Cl. ............... 705/37; 705/26; 705/35; 705/36 R

(58) Field of Classification Search ........... 705/26, 705/35–37
See application file for complete search history.

(56) References Cited

U.S. PATENT DOCUMENTS

| | | | | |
|---|---|---|---|---|
| 5,101,353 A * | 3/1992 | Lupien et al. | .......... | 705/37 |
| 6,408,282 B1 * | 6/2002 | Buist | .......... | 705/36 R |
| 6,704,716 B1 * | 3/2004 | Force | .......... | 705/80 |
| 7,296,001 B1 * | 11/2007 | Ephrati et al. | .......... | 705/37 |
| 7,475,046 B1 * | 1/2009 | Foley et al. | .......... | 705/74 |
| 7,720,742 B1 * | 5/2010 | Mauro et al. | .......... | 705/37 |
| 2001/0032171 A1 * | 10/2001 | Brink et al. | .......... | 705/37 |
| 2002/0007335 A1 * | 1/2002 | Millard et al. | .......... | 705/37 |
| 2002/0188555 A1 * | 12/2002 | Lawrence | .......... | 705/37 |
| 2003/0088501 A1 * | 5/2003 | Gilbert et al. | .......... | 705/37 |
| 2004/0030630 A1 * | 2/2004 | Tilfors et al. | .......... | 705/37 |
| 2004/0034591 A1 * | 2/2004 | Waelbroeck et al. | .......... | 705/37 |
| 2004/0059666 A1 * | 3/2004 | Waelbroeck et al. | .......... | 705/37 |
| 2004/0064396 A1 * | 4/2004 | Say | .......... | 705/37 |
| 2004/0254804 A1 * | 12/2004 | Peterffy et al. | .......... | 705/1 |
| 2005/0234805 A1 * | 10/2005 | Robertson et al. | .......... | 705/37 |
| 2006/0080219 A1 * | 4/2006 | Lutnick et al. | .......... | 705/37 |
| 2007/0106594 A1 * | 5/2007 | Vlahoplus et al. | .......... | 705/37 |
| 2008/0027820 A1 * | 1/2008 | Brill | .......... | 705/26 |
| 2008/0052189 A1 * | 2/2008 | Walker et al. | .......... | 705/26 |
| 2008/0147534 A1 * | 6/2008 | Ephrati et al. | .......... | 705/37 |
| 2008/0162316 A1 * | 7/2008 | Rampell et al. | .......... | 705/35 |
| 2009/0030848 A1 * | 1/2009 | Wendel | .......... | 705/80 |
| 2009/0070250 A1 * | 3/2009 | Adcock et al. | .......... | 705/37 |
| 2009/0112751 A1 * | 4/2009 | Miller et al. | .......... | 705/37 |
| 2009/0138374 A1 * | 5/2009 | Cohen | .......... | 705/26 |
| 2010/0082500 A1 * | 4/2010 | Lutnick et al. | .......... | 705/36 R |
| 2010/0161475 A1 * | 6/2010 | Samsky et al. | .......... | 705/37 |

* cited by examiner

*Primary Examiner*—Narayanswamy Subramanian
*Assistant Examiner*—Ryan D Donlon
(74) *Attorney, Agent, or Firm*—Dickstein Shapiro, LLP

(57) ABSTRACT

An electronic trading system and method are disclosed for implementing an electronic trading protocol that permits buyers and sellers to "negotiate in the middle" or "NIM" i.e., to negotiate the purchase and sale of an item (e.g., securities) at a price between or equal to the best current bid and offer prices for the item through the submission of an initial NIM order and one or more NIM counteroffer orders. In a preferred embodiment, each NIM session may comprise two phases, a NIM private phase and a NIM public phase. During the NIM private phase, the initial NIM order is presented only to the trader on the opposite side of the market with the highest ranked order based on price and time priority. During the NIM public phase, the initial NIM order is presented to all traders on the opposite side of the market with pending orders at the best market price. The trader who submitted the initial NIM order is preferably granted authority to determine whether or not a public phase for the NIM should be allowed.

7 Claims, 14 Drawing Sheets

SYSTEM AND METHOD FOR PROCESSING TRADING ORDERS TO PROVIDE "NEGOTIATE IN THE MIDDLE" CAPABILITY

BACKGROUND OF THE INVENTION

In many markets, buy and sell orders at the same price are automatically matched. Thus, for example, a first order to buy an item at a price of 100 and a second order to sell the same item at a price of 100 will, in such markets, result in a transaction in which some quantity of the item is sold at the specified price.

But in some markets, orders of equal price are not automatically matched. Rather, certain types of buy and sell orders, called "passive" orders, may co-exist at the same price without triggering a transaction. These passive orders do not trade unless "aggressed" against by a trader submitting a second type of order, called an "aggressive" order. Historically, a passive order to buy has been referred to as a "bid," while a passive order to sell has been referred to as an "offer." By contrast, an aggressive order to sell has been referred to as a "hit," while an aggressive order to buy has been referred to as a "take" or "lift."

This distinction between passive and aggressive orders is one of several characteristics that developed in certain markets to encourage market liquidity. In particular, since it is impossible to generate liquidity in a market without having someone first make a price, brokers historically sought to encourage traders to submit bids and offers by not charging them a commission if their orders resulted in a trade. Thus, passive bids and offers could not be matched even at the same price since neither the buyer nor the seller would pay commission.

In addition to commission-free trades, brokers in some markets also rewarded buyers and sellers by developing a number of trading protocols or conventions which granted certain buyers and sellers specified trading options or "rights." One such convention is commonly referred to as "workup." In general terms, this convention permits buyers and sellers to "work up" the size of a trade from the quantity traded as a result of an initial "hit" or "lift."

Even before electronic trading, brokers utilized a substantial amount of technology to store and distribute real-time market information to their customers. More specifically, when a trader called a broker with a bid or offer for a given security, the broker typically entered the order into an electronic system which used the information to develop a picture of the prices and volumes available on the bid and offer sides of the market in that security. This information was distributed in real time to the broker's customers for display on small CRT screens on traders' desks. In addition, when a broker received an aggressive hit or lift order from a trader, the broker would similarly enter the aggressive order into the firm's electronic system. This would cause the CRT screens on traders' desks to flash, indicating to the market that a workup was in progress.

As noted, brokers typically entered bids and offers telephoned in by customers into the brokers' electronic systems as the orders were received. From time to time, however, a trader might call his or her broker and request that a bid or offer at a better price than the current best price in the market be kept "off the screen" and presented to less than the entire market, to see if such a bid or offer might stimulate trading interest.

When informed of the offscreen bid or offer, the potential counterparty might hit or lift it, which would cause a transaction to occur. When this happened, the broker might flash this transaction on the traders' screens and attempt to work up the trade further.

Alternatively, the potential counterparty might decline to hit or lift the off-the-screen bid or offer but instead counter with a price of his or her own. The trader that submitted the initial offscreen bid or offer might then choose to hit or lift this counter-price, resulting in a transaction, or choose to negotiate the price further with the potential counterparty.

As electronic trading has spread, some electronic platforms have been programmed to provide automated versions of trading conventions and practices like the ones described above. In some cases, however, a simple one-to-one translation from a voice practice to an electronic trading practice is not practical or advisable for commercial reasons. In such cases, it is desirable to modify the traditional voice protocol or practice to optimize its performance in an electronic trading environment.

SUMMARY OF THE INVENTION

An electronic trading system and method are disclosed for implementing a trading protocol that permits buyers and sellers to "negotiate in the middle," i.e., to negotiate the purchase and sale of an item (e.g., securities) at a price between or equal to the best current bid and offer prices for the item. In a preferred embodiment, the system and method of the present invention employ a distributed computer processing network that links together a matching engine and a plurality of trader workstations.

In a preferred embodiment, each "negotiate in the middle" ("NIM") session may comprise two phases, a NIM private phase and a NIM public phase. During the NIM private phase, NIM orders from the initiator are presented only to the trader on the opposite side of the market with the highest ranked order based on price and time priority. During the NIM public phase, NIM orders from the initiator are presented to all traders on the opposite side of the market with pending orders at the best market price. The trader who submitted the initial NIM order is preferably granted authority to determine whether or not a public phase for the NIM should be allowed.

NIM negotiations are preferably anonymous (i.e., the negotiating parties are not informed of each other's identity) and confidential (i.e., market participants not involved in a NIM are not informed that a NIM is in progress or of the terms of any NIM orders). In addition, in a preferred embodiment, the minimum pricing increment applied to NIM orders is smaller than that applied to other orders for the item. Thus, for example, if the item typically trades in increments of $1/32$, NIM orders may preferably be submitted in increments of $1/64$.

In a preferred embodiment, where a NIM order is accepted by a counterparty and a trade results, the initial transaction and any subsequent workup occur at the NIM order price. Thus, as will be recognized, the system and method of the present invention permits a trade (including any workup) to occur at a price (e.g. $10^{15}/64$) not typically available to traders submitting non-NIM bids, offers, hits, and takes. At the conclusion of a NIM workup, any remaining size shown on the follow is preferably priced at the closest available non-NIM price increment equal to or below the price at which the NIM workup was conducted for buy side orders and equal to or above the price at which the NIM workup was conducted for sell side orders. Thus, for example, where non-NIM orders may be submitted in $1/32$ increments and NIM orders may be submitted in $1/64$ increments, if the NIM workup price is $10^{15}/64$, remaining volume, if on the buy side, will be re-priced to $10^{7}/32$ and remaining volume, if on the sell side, will be re-priced to 10⁸⁄₃₂. By contrast, if the NIM workup price is 10¹⁶⁄₆₄, then any remaining buy side or sell side volume will preferably be priced at 10⁸⁄₃₂.

DETAILED DESCRIPTION OF THE INVENTION

Figure 1:
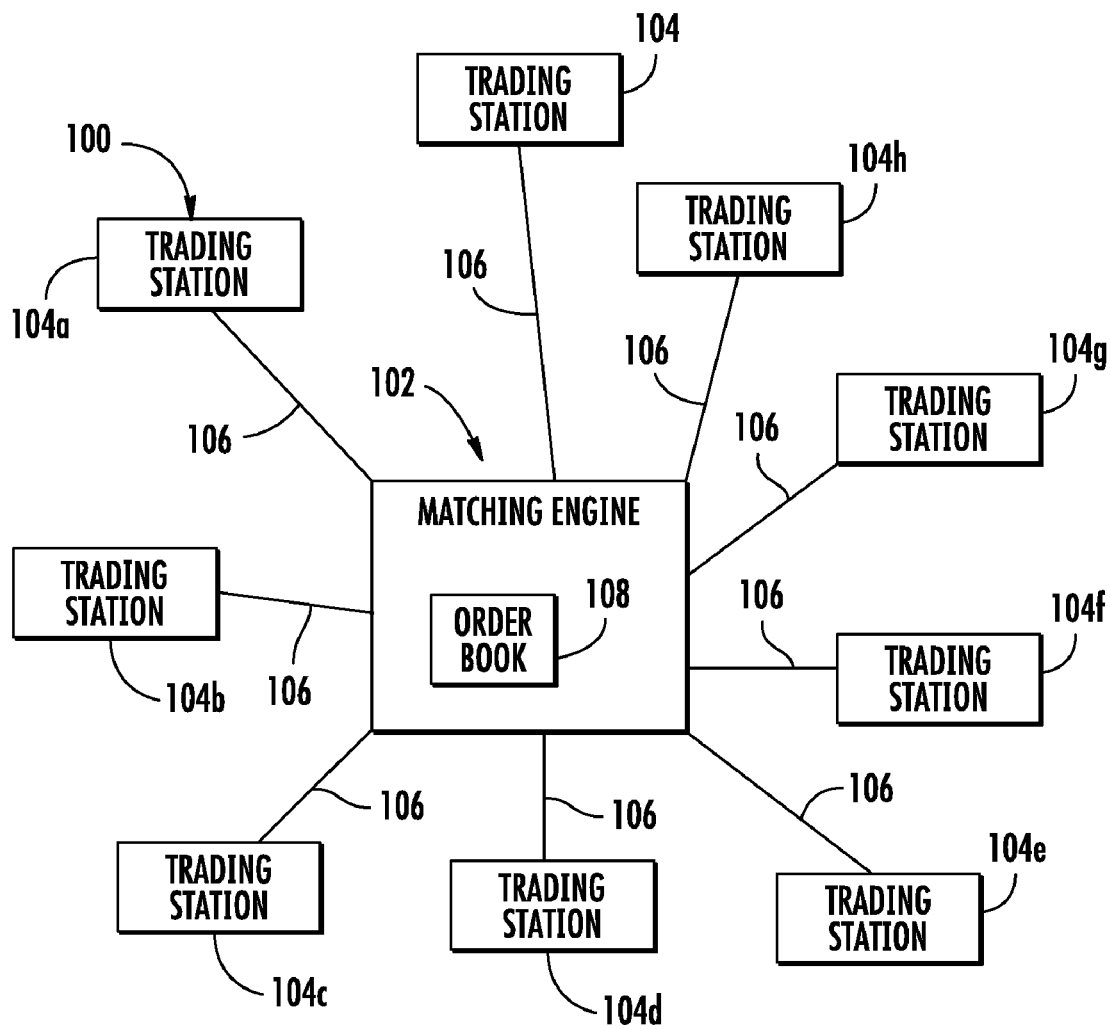
FIG. 1 is a block diagram depicting aspects of a preferred embodiment of the present system.

With reference to FIG. 1, there is shown a system 100 comprising a matching engine 102 and a plurality of customer terminals 104 connected via appropriate communication links 106. Matching engine 102 is preferably adapted to receive orders to buy and sell securities from terminals 104, to process trading orders in accordance with specified protocols, and to communicate market information concerning trading activity to terminals 104, as described in more detail below.

Matching engine 102 preferably comprises one or more server computers and associated components programmed to implement the trading activity described below. As further shown in FIG. 1, matching engine 102 preferably maintains an order book 108 that stores orders received by matching engine 102 from terminals 104, as described in more detail below.

Each terminal 104 may preferably be a computer workstation comprising a CPU, memory, a display, and input devices, such as a mouse, keyboard, or specialized trading keypad. Terminals 104 may be provided to customers for direct entry of buy and sell orders on their own behalf, or to brokers for entry of such orders on behalf of others. Communication links 106 may comprise any appropriate arrangement of wired or wireless communication lines or networks, such as the Internet or dedicated communication lines.

In a preferred embodiment, traders at terminals 104 submit bids and offers for specified securities at specified prices and volumes to matching engine 102 where they are stored in order book 108. These bids and offers are used to develop a two-sided market for display to all traders that informs the traders of the quantities of each security available at different prices.

Bids and offers are preferably ranked in order book 108 based on price then time priority. Thus, for example, if a first trader, Trader A, and a second trader, Trader B, each submit a bid to purchase 10M of a given security at par, the orders are stored in order book 108 based on time priority and the market is informed that 20M of the specified security is available for purchase at par.

Typically, a spread (i.e., difference in price) will develop between the best bid and best offer in the market for a given security. The size of this spread may be such that no aggressive buyer is willing to buy at the best available selling price and no aggressive seller is willing to sell at the best available buying price. The present invention provides a mechanism whereby specified buyers and sellers in the market may "negotiate in the middle" or NIM, i.e., negotiate to buy and sell at a price between the best available bid and offer prices. NIM trading may preferably be selectively enabled for some or all instruments traded via matching engine 102.

A preferred embodiment for providing NIM trading will now be described in connection with FIGS. 2A-D. Beginning with FIG. 2A, at step 202, a NIM is preferably initiated by the submission of an initial NIM order that sets forth a quantity of a specified security and a price for the security at which the submitting trader is willing to trade the specified quantity. Preferably, a NIM may be initiated only by a trader with a pending order at the best available price for the security on either the buy or sell side of the market. More specifically, an initial NIM order to buy a security may only be submitted by a trader with a pending bid at the best price currently available in the market. Similarly, an initial NIM order to sell a security may only be submitted by a trader with a pending offer at the best price currently available. In addition, all NIM orders preferably must state a price that is between or equal to the best bid price and best offer price in the market. In addition, in a preferred embodiment, NIM orders may be required to specify a minimum size, which size may differ, and may preferably be greater than, the minimum size requirement for bids and offers in the instrument. NIM orders that do not satisfy these requirements are preferably rejected by the system, as shown at steps 204-206. The system is also preferably adapted to permit only a single NIM to occur at any one time. Accordingly, initial NIM orders received while a NIM is already in progress are also preferably rejected by the system.

In a preferred embodiment, NIM processing in accordance with the present invention comprises two phases: a private phase and a public phase, each of which is controlled by a system clock. In particular, at step 208, when an authorized initial NIM order is received, the system preferably initiates the NIM private phase clock which is preferably set to some set number of seconds established by a system administrator. Moving to FIG. 2B, at step 210, the initial NIM order is preferably presented to the trader with the highest ranked bid or offer on the opposite side of the market from the NIM initiator. Thus, for example, where two or more traders on the opposite side of the market from the NIM initiator have pending bids or offers at the same price, the initial NIM order is preferably presented only to the trader with the highest ranked bid or offer, which in a price then time priority environment is the trader that first submitted his or her bid or offer. In a preferred embodiment, NIM trading in the private phase is conducted via special negotiation screens presented only to the NIM initiator and his or her NIM private phase counterparty that are not shown to other traders. Thus, the NIM negotiation, including the fact that such a negotiation is being conducted, is preferably kept confidential with respect to the rest of the market.

As shown at step 212, the trader that received the initial NIM order may respond to that order in one of four ways: (1) by accepting the order; (2) by negotiating in response to the order; (3) by rejecting the order; or (4) by ignoring the order. If the counterparty trader accepts the NIM initiation order, processing proceeds to step 214 where the system executes a transaction for the quantity specified in the NIM initiation order at the price specified in the NIM initiation order. At step 216, a workup is preferably commenced during which continued trading in the specified security may occur. The present invention may implement any preferred workup algorithm in step 216. In a preferred embodiment, the party that accepts a NIM order (either the initial NIM order or any NIM counteroffer order) is considered the aggressor for purposes of determining whether the market is trading up (if the party that accepted the NIM is a buyer) or down (if the party that accepted the NIM is a seller). In an alternative embodiment, step 216 may be eliminated and the transaction described in step 214 may be executed without triggering any workup. In a preferred embodiment, where a non-NIM transaction is executed at any point during a NIM prior to execution of a NIM transaction, the NIM is terminated.

Returning to step 212, if the counterparty trader elects to negotiate in response to the order, he or she submits a NIM counteroffer order with a proposed counter-quantity and/or counter-price. Processing then proceeds to step 218, where the private phase clock is reset and to step 210 where the counteroffer is presented to the party's "counterparty," i.e., the NIM initiator. The NIM initiator can respond to the counteroffer in any of the four ways shown in step 212, i.e., by accepting the order (resulting in a trade and workup), by negotiating in response to the order (resulting in a counteroffer being presented to the NIM initiator's counterparty), or by rejecting or ignoring the counteroffer (resulting in the processing described below for rejection or ignoring of a NIM order). Thus, as will be recognized, the process of negotiation between the NIM initiator and his or her counterparty shown in FIG. 2B may continue for several rounds of negotiation with the NIM private phase timer being reset each time a new counteroffer is submitted by either party.

Returning again to step 212, if the counterparty trader elects to reject the initial NIM order or if the counterparty trader ignores the initial NIM order and permits the NIM private phase clock to expire, processing proceeds to step 220, where the system determines whether the last NIM order was entered by the NIM initiator. More specifically, in the preferred embodiment shown in FIG. 2C, decision step 220 will resolve to "Yes," where a NIM initiation order is submitted by a NIM initiator and the counterparty to whom it is presented rejects or ignores it, or where two or more counteroffer orders were submitted during the NIM private phase but the final counteroffer is submitted by the NIM initiator and then rejected or ignored by the counterparty. By contrast, decision step 220 will resolve to "No" where one or more counteroffer orders were submitted during the NIM private phase but the final counteroffer is submitted by the counterparty.

Where decision step 220 resolves to "No," the NIM terminates as shown at step 222. Otherwise, processing proceeds to step 224, where the system determines whether the NIM initiator elected to have his or her NIM orders shown to traders in addition to the trader with the highest ranked order on the opposite side of the market. In some embodiments, steps 220 and 222 may be omitted and processing may proceed directly from step 218 to step 224. Continuing with step 224, in a preferred embodiment, each NIM initiator is preferably granted an option at the time he or she submits an initial NIM order to check a box on his or her user interface that indicates whether the NIM process should terminate at the conclusion of the NIM private phase or whether a NIM public phase should be conducted during which the NIM initiator's then pending NIM order is presented to other traders with pending orders on the opposite side of the market.

Figure 2A:
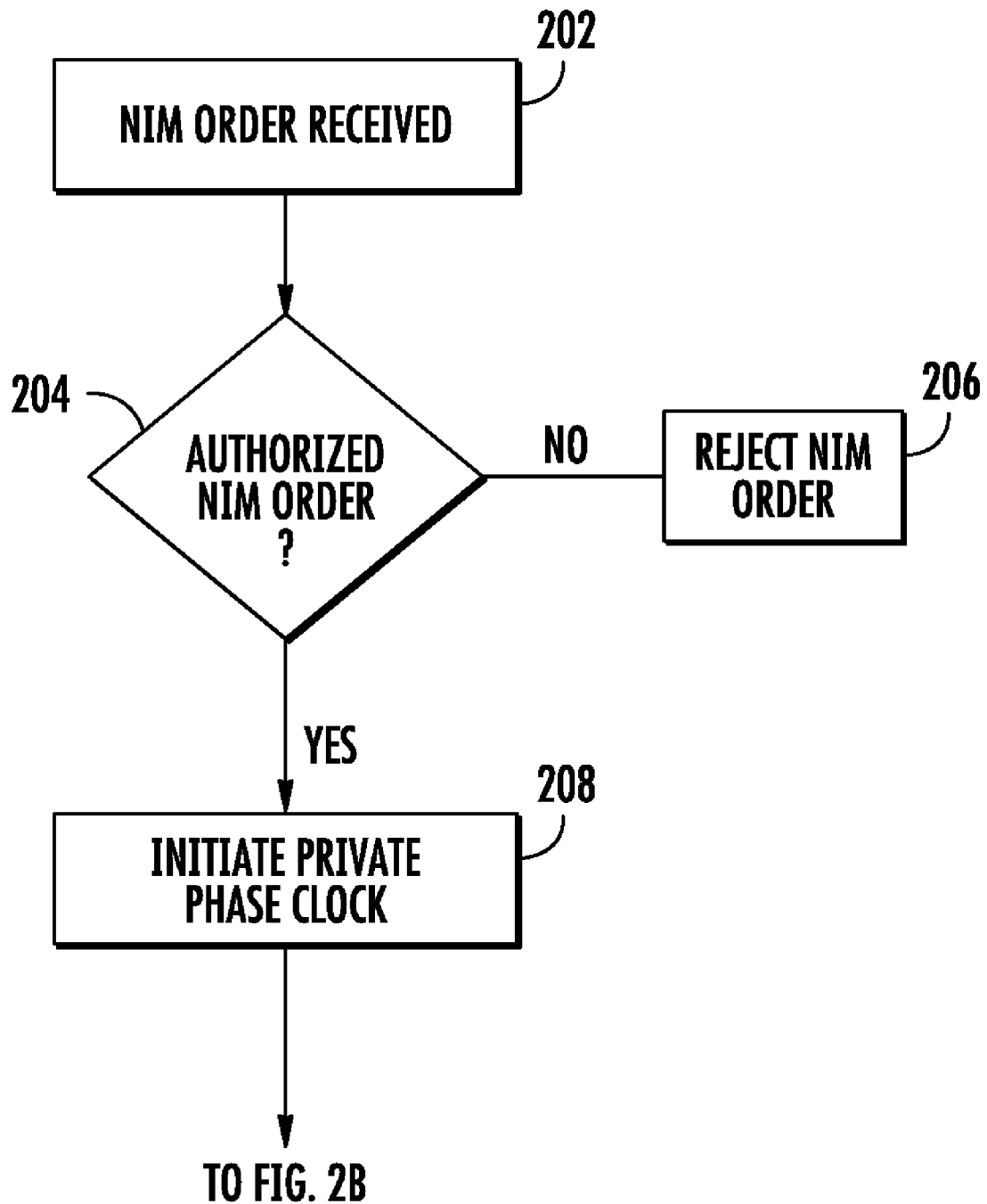
FIGS. 2A-D are flow diagrams illustrating aspects of system operation in a preferred embodiment of the present invention.
Figure 2B:
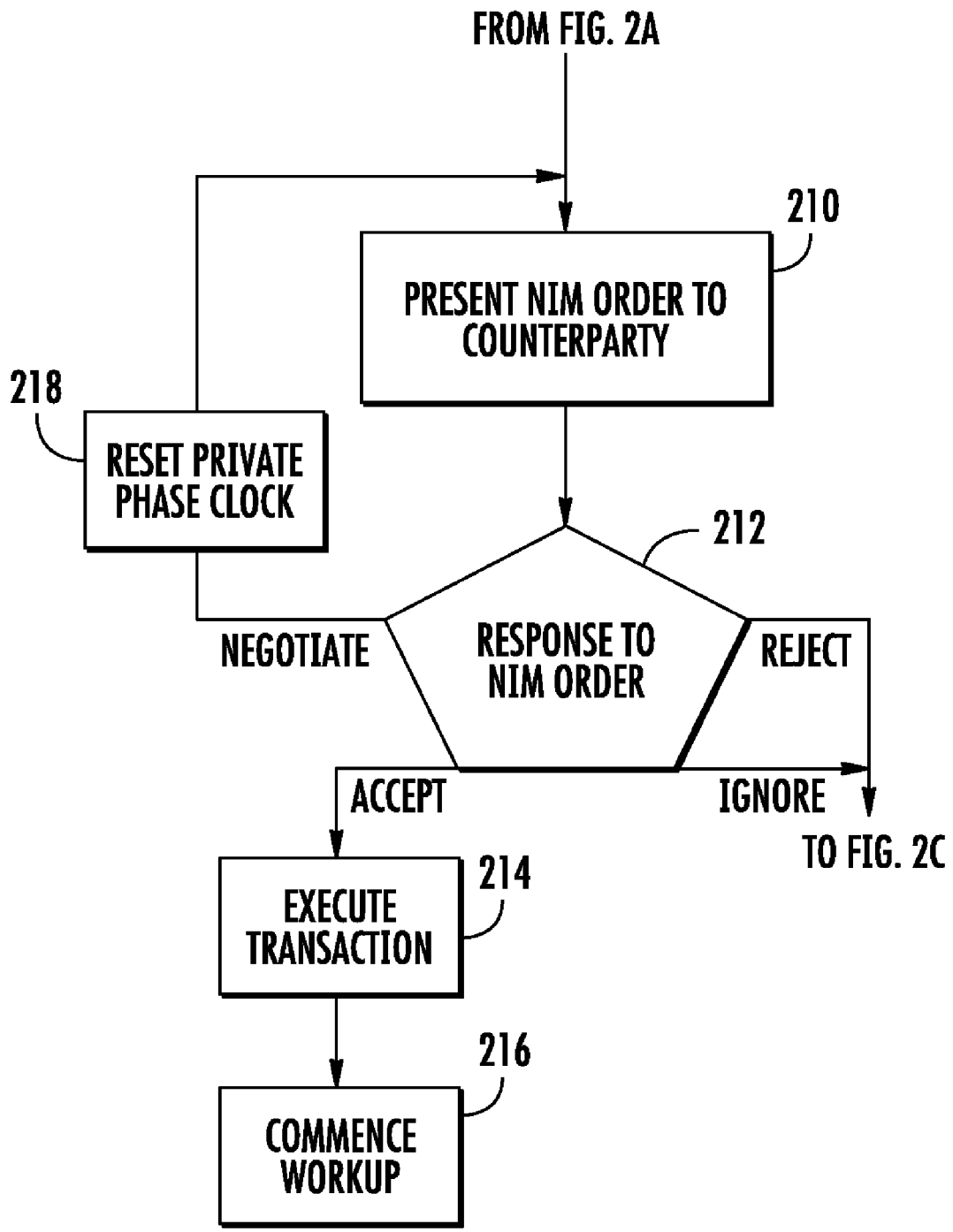
Figure 2C:
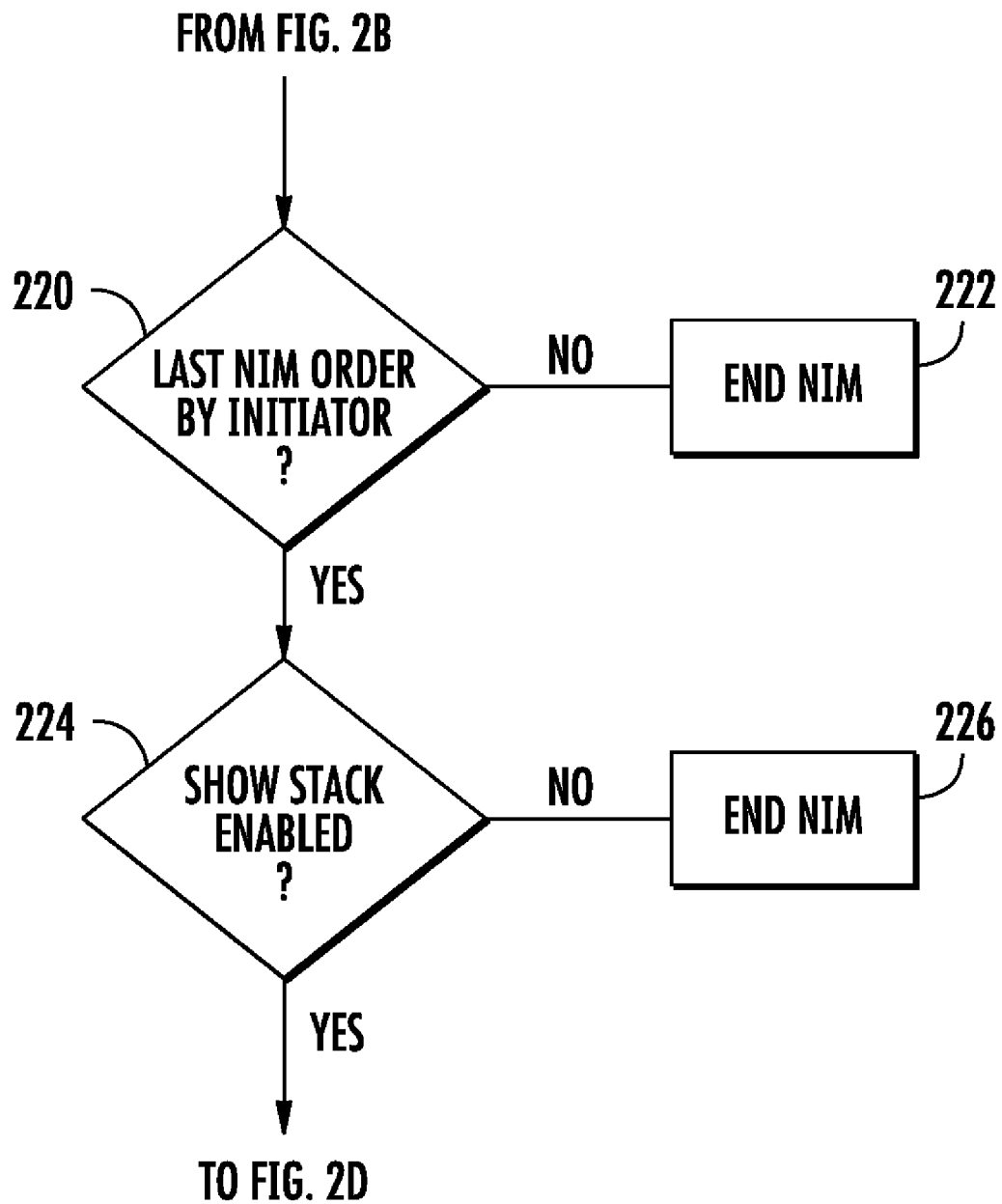
Figure 2D:
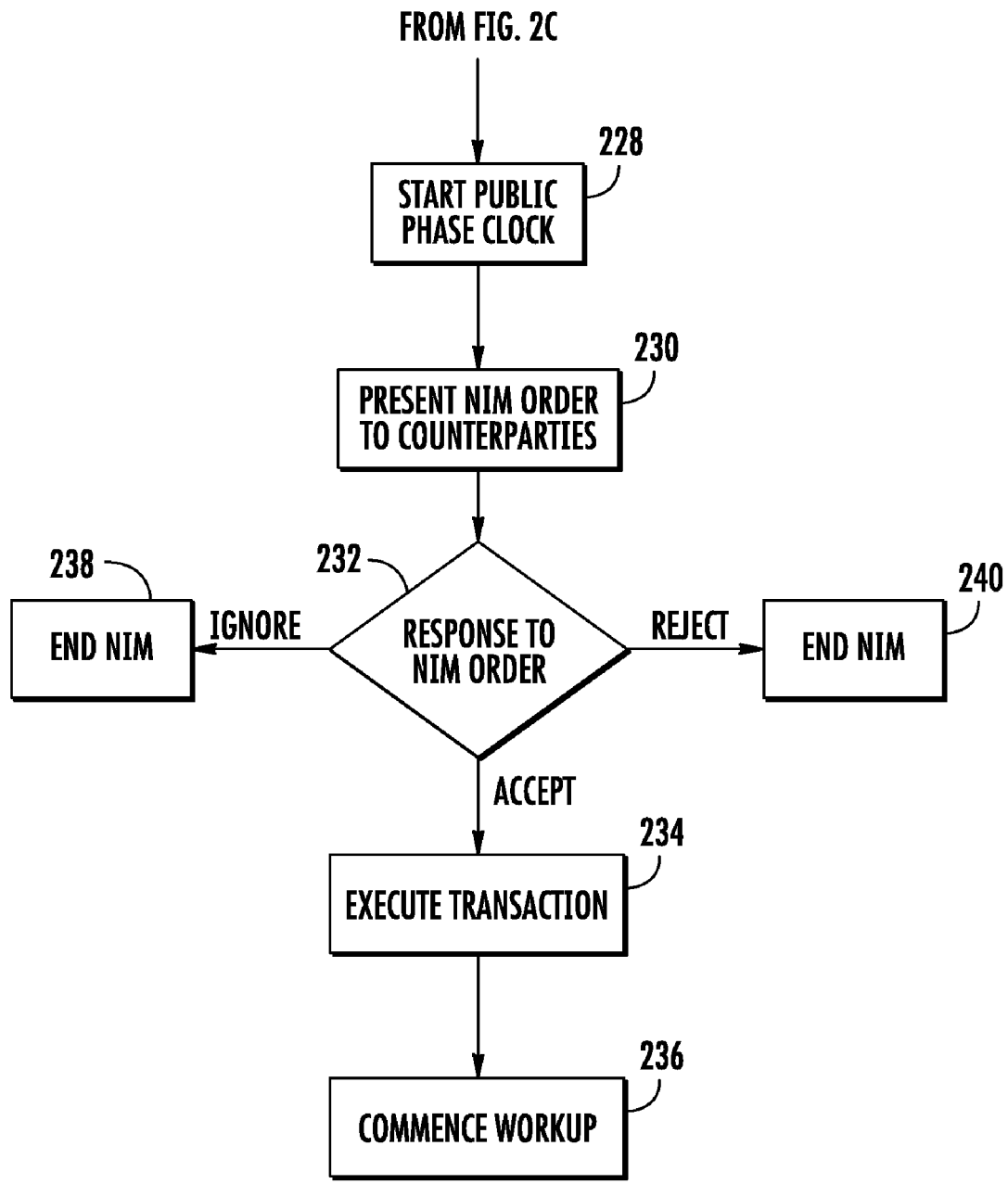
Figure 3A:
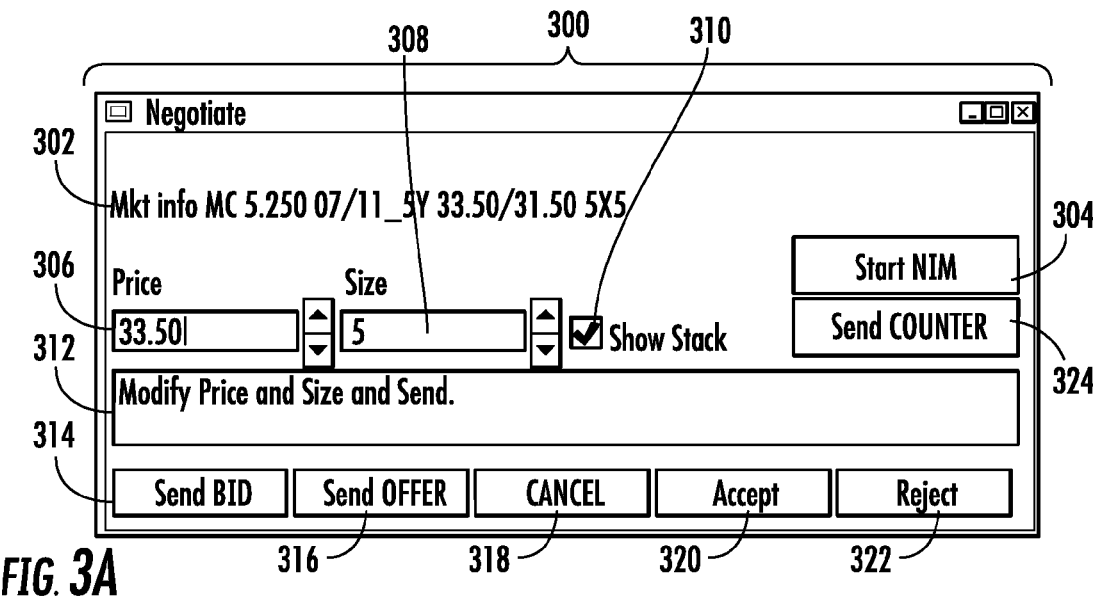
FIGS. 3A-J show preferred embodiments of user interface windows suitable for use in connection with NIM trading.
Figure 3B:
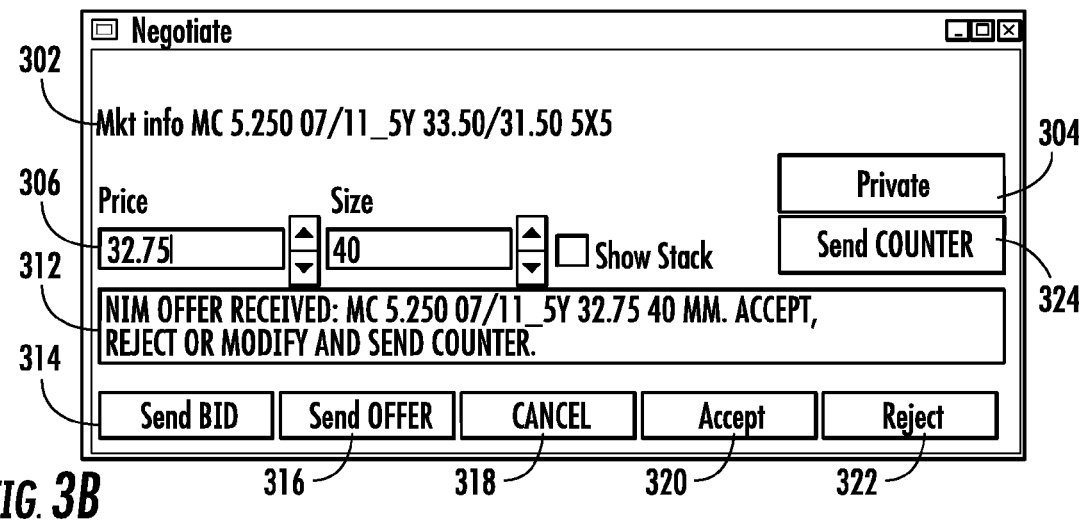
Figure 3C:
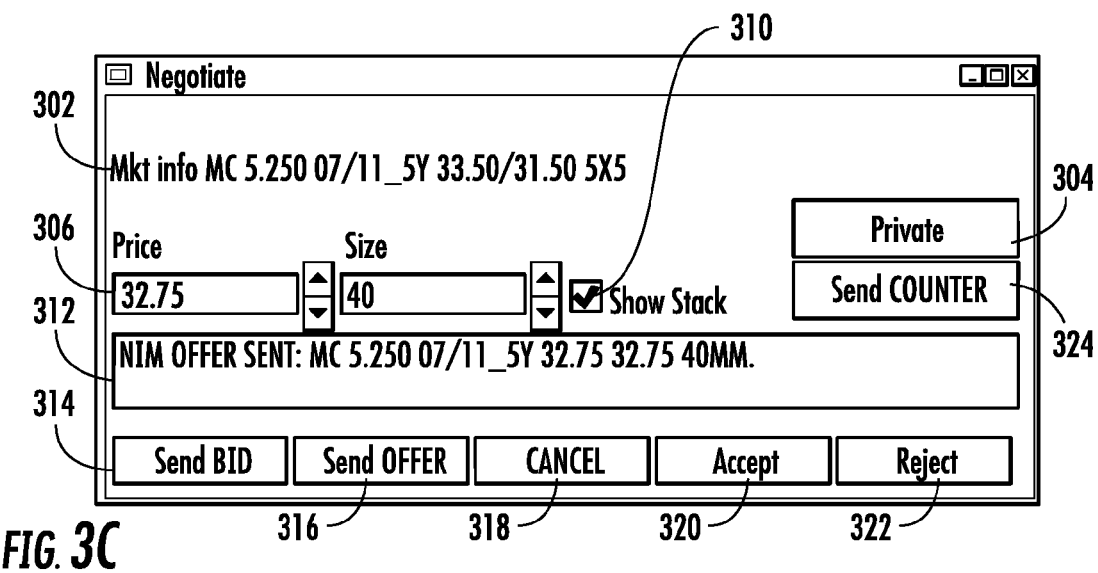
Figure 3D:
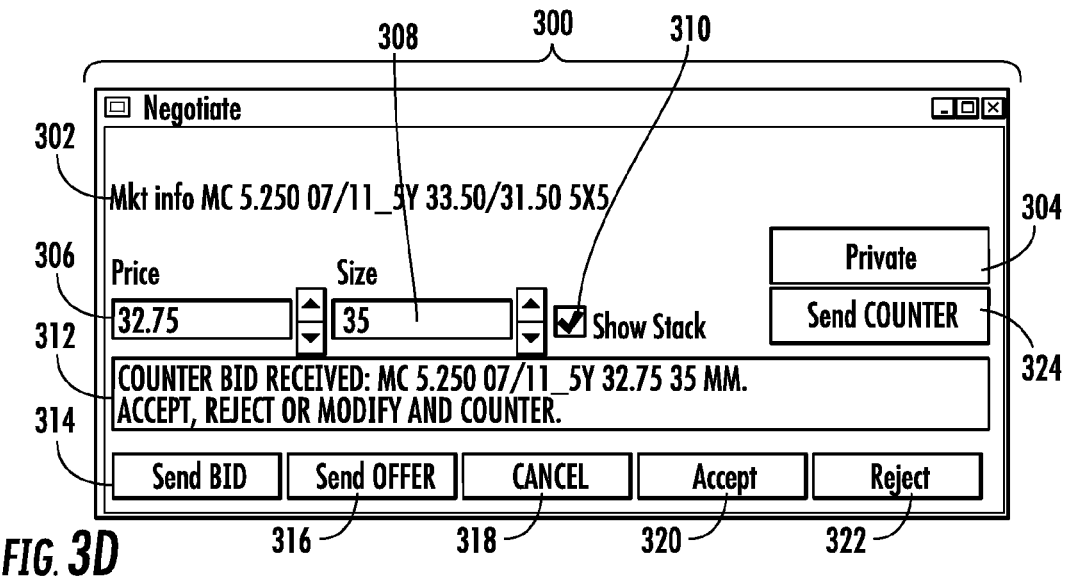
Figure 3E:
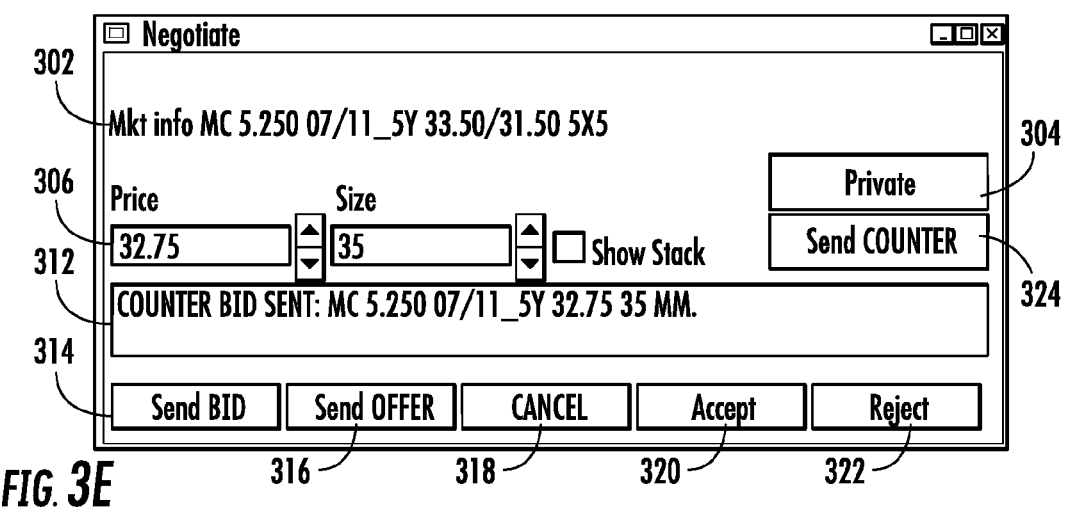
Figure 3F:
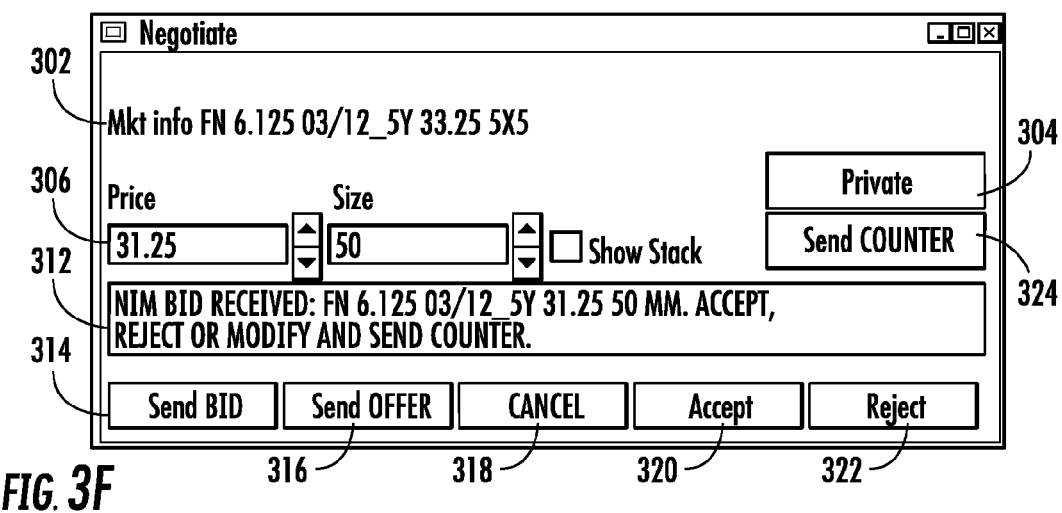
Figure 3G:
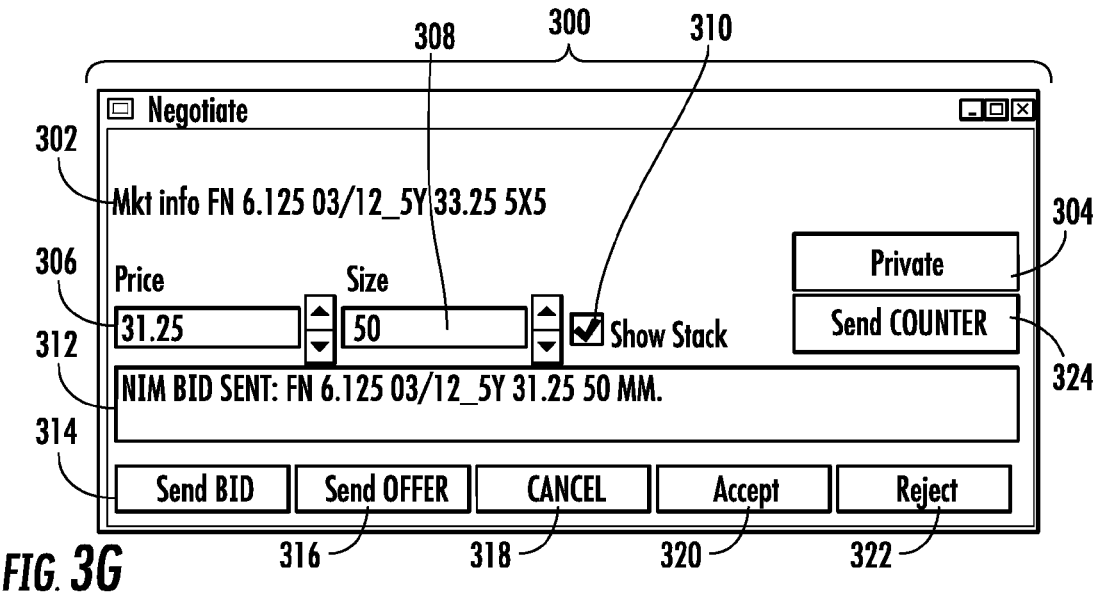
Figure 3H:
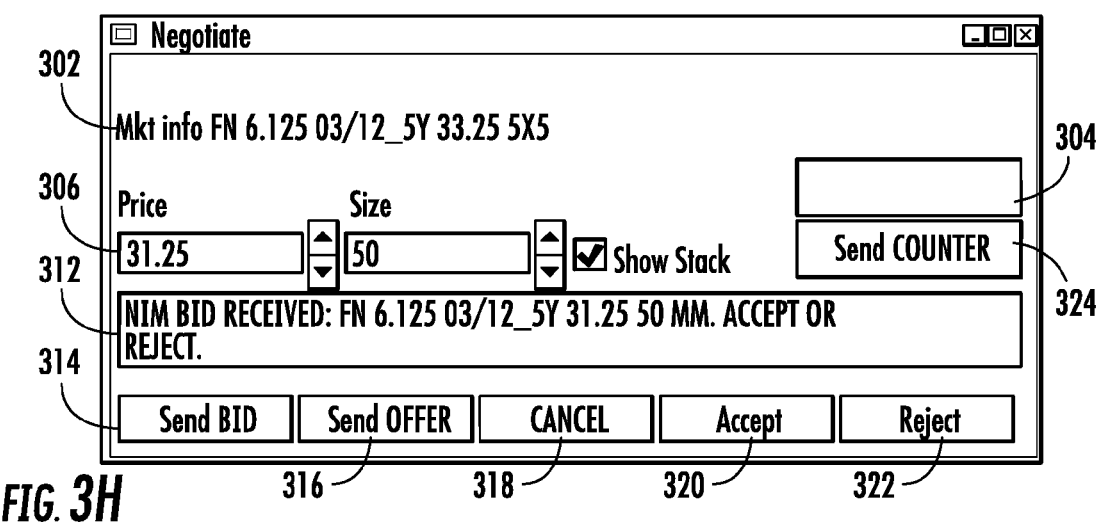
Figure 3I:
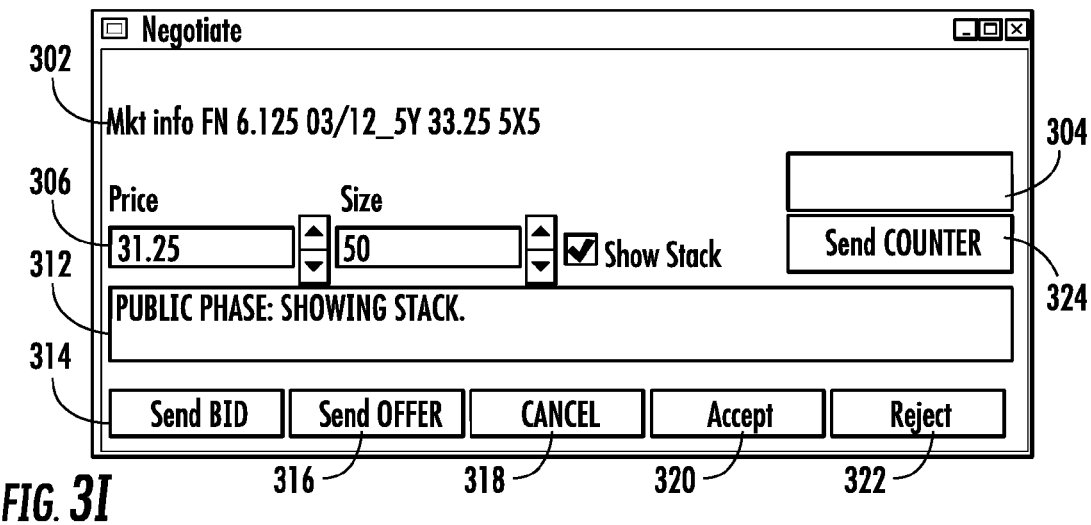
Figure 3J:
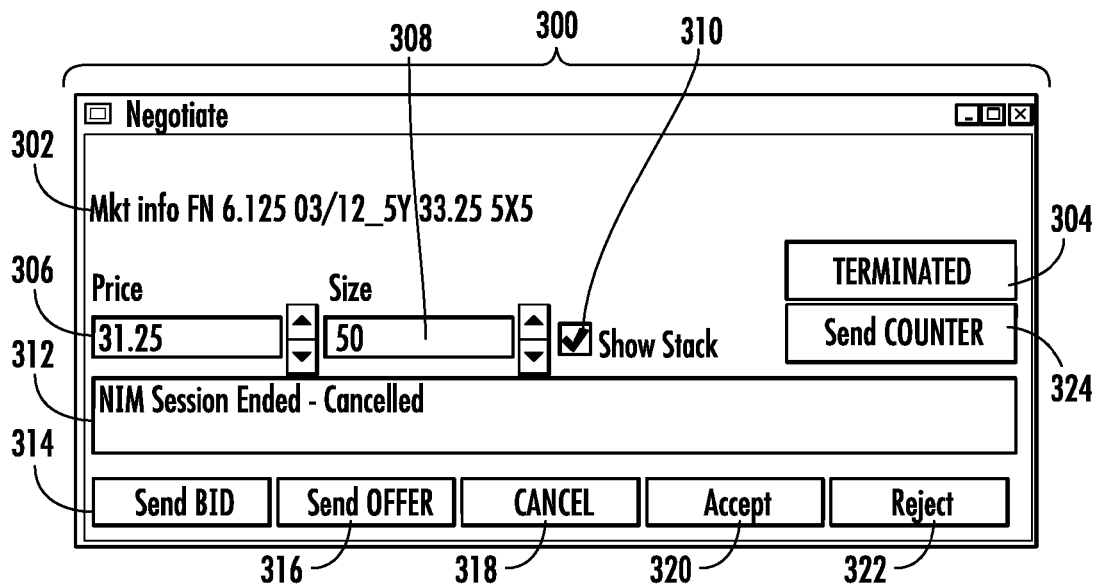

More specifically, if the NIM initiator selected "show stack" at the time he or she submitted his or her NIM initiation order (step 224, YES), processing proceeds to step 228, as described in more detail below and as shown in FIG. 2D. Otherwise, the NIM terminates as shown at step 226.

As noted, where the NIM initiator has elected to have a public phase to the NIM, processing proceeds to step 228 where a NIM public phase timer is started. The NIM public phase timer is preferably set to some set number of seconds established by a system administrator which may be the same as or different from the number of seconds set for the NIM private phase timer. Unlike the NIM private phase timer, however, the NIM public phase timer is preferably not resettable.

At step 230, the most recent NIM order is preferably presented to all traders on the opposite side of the market with pending bids or offers at the best market price. As shown in step 232, each trader that receives this order may preferably respond in one of three ways: (1) by accepting the order; (2) by rejecting the order; or (3) by ignoring the order. The first trader to accept the order becomes the counterparty to the NIM initiator and processing proceeds to step 234, where the system executes a transaction between those two parties for the quantity specified in the NIM initiator's order at the price specified in that order. In step 236, a workup is preferably commenced during which continued trading of the specified security may occur. As above, the present invention may implement any preferred workup algorithm in step 236 and, in an alternative embodiment, step 236 may be eliminated and the transaction described in step 234 may be executed without triggering any workup. In alternative preferred embodiments, all traders on both sides of the market may be permitted to participate in the NIM public phase in cases where the last NIM order during the NIM private phase was entered into by the NIM initiator, the last NIM order during the NIM private phase was entered into by the NIM private phase counterparty, or in both sets of cases.

Returning to step 232, if all of the potential counterparty traders elect to reject the NIM initiator's order or to ignore the NIM initiator's order until the NIM public phase clock expires, the NIM concludes without any transaction, as shown at steps 238 and 240.

In a preferred embodiment, the system comprises a hold-in timer during which a trader submitting an initial NIM order cannot cancel the order. The length of the hold-in timer is preferably established by a system administrator. Once the hold-in timer expires, the trader may cancel his or her NIM order even before expiration of the NIM private phase timer. In addition, in a preferred embodiment, a NIM is immediately cancelled if the screen price in the security under negotiation (as set by the best bid or offer in the market) becomes equal to or better than the current NIM price. A NIM also preferably may not be initiated during a locked market (i.e., when there is no spread), although a NIM participant may preferably submit a NIM order with a price exactly equal to the best price on the opposite side of the market. In the event that this NIM price is accepted, the submitting trader would be the passive party to the trade, as described above. In addition, in a preferred embodiment, if a NIM order is submitted by one side of the market that is equal to the best bid or offer price on the other side of the market, the receiver of the NIM order is permitted only to accept, reject, or ignore the NIM order but not to counter. The reason for this is that a counteroffer for greater than the volume shown by the trader that receives the NIM could result, if accepted by his or her counterparty, in the receiving trader executing more volume than he or she had originally shown in his or her bid or offer as a passive party, which would be unfair to the traders waiting behind the receiving trader whose shown volume should be executed first.

In a preferred embodiment, each trader can set whether or not he or she wishes to have access to MM trading via application settings at his or her terminal 104. Terminals 104 are also preferably adapted to permit traders to set specific NIM notification sounds to alert the trader to changes (e.g., receipt of a new NIM counteroffer order) during a NIM.

NIM negotiations are preferably anonymous (i.e., the negotiating parties are not informed of each other's identity) and confidential (i.e., market participants not involved in a NIM are not informed that a NIM is in progress or of the terms of any NIM orders). In addition, in a preferred embodiment, the minimum pricing increment applied to NIM orders is smaller than that applied to other orders for the item. Thus, for example, if the item typically trades in increments of $\frac{1}{32}$, NIM orders may preferably be submitted in increments of $\frac{1}{64}$.

In a preferred embodiment, where a NIM order is accepted by a counterparty and a trade results, the initial transaction and any subsequent workup occur at the NIM order price. Thus, as will be recognized, the system of the present invention permits a trade (including any workup) to occur at a price (e.g., $10^{15}/_{64}$) not typically available to traders submitting non-NIM bids, offers, hits, and takes. At the conclusion of a NIM workup, any remaining size shown on the follow is preferably priced at the closest available non-NIM price increment equal to or below the price at which the NIM workup was conducted for buy side orders and equal to or above the price at which the NIM workup was conducted for sell side orders. Thus, for example, where non-NIM orders may be submitted in $\frac{1}{32}$ increments and NIM orders may be submitted in $\frac{1}{64}$ increments, if the NIM workup price is $10^{15}/_{64}$, remaining volume, if on the buy side, will be re-priced to $10^{7}/_{32}$ and remaining volume, if on the sell side, will be re-priced to $10^{8}/_{32}$. By contrast, if the NIM workup price is $10^{16}/_{64}$, then any remaining buy side or sell side volume will preferably be priced at $10^{8}/_{32}$.

FIGS. 3A-J show preferred embodiments of user interface windows suitable for use in connection with NIM trading as described above. As will be recognized, FIGS. 3A-J show examples of a single style window for two different securities (FIGS. 3A-E and FIGS. 3F-J). In particular, as shown for example in FIG. 3A, a user interface window 300 may comprise a first field 302 that provides a trader a market snapshot for a selected instrument; a second field 304 that displays NIM status to the trader (set to "Start NIM" in FIG. 3A to indicate that the trader may start a NIM from this window); a third field 306, that permits the trader to select a NIM price; a fourth field 308 that permits the trader to select a NIM quantity; a selectable box 310 that permits the trader to select whether he or she prefers to have a public phase for the NIM order if the private phase does not result in a transaction; a fifth field 312 in which may be displayed instructions (e.g., on how to enter a NIM order) or NIM status or error message information; a first button 314 for sending a NIM bid; a second button 316 for sending a NIM offer; a third button 318 for canceling a NIM bid or offer; a fourth button 320 for accepting a NIM order; a fifth button 322 for rejecting a NIM order; and a sixth button 324 for sending a NIM counteroffer order. As will be recognized, appropriate buttons may be made selectable or non-selectable as appropriate. Thus, for example, in the embodiment shown in FIG. 3A, Send BID button 314, Cancel button 318, Accept button 320, Reject button 322, and Send COUNTER button 324 are not selectable but Send OFFER button 316 is, since in this example a NIM has not begun and the trader is on the offer side of the market and thus permitted to enter a NIM from that side only. Field 308 may preferably be adapted to default to the NIM minimum size. Alternatively, field 308 may be adapted to default to a different size, e.g., the original order shown size.

Figure 4A:
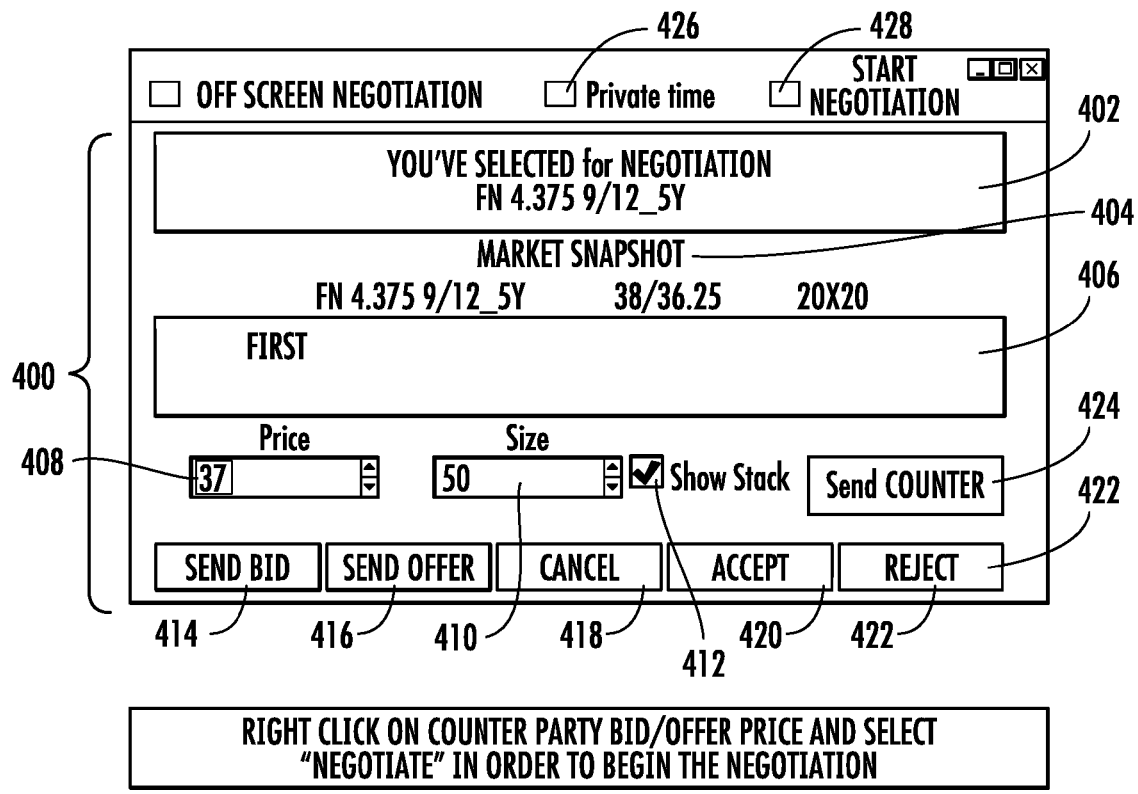
FIGS. 4A-D show preferred embodiments of alternative user interface windows suitable for use in connection with NIM trading.

FIGS. 4A-D show preferred embodiments of alternative user interface windows suitable for use in connection with NIM trading as described above. In particular, as shown in FIG. 4A, a user interface window 400 may comprise a first field 402 for displaying messages to the trader, e.g., a message that confirms to the trader that he or she has selected a particular instrument for a NIM order; a second field 404 that provides the trader a market snapshot for the selected instrument; a third field 406 in which may be displayed instructions (e.g., on how to enter a NIM order) or NIM status or error message information; a fourth field 408 that permits the trader to select a NIM price; a fifth field 410 that permits the trader to select a NIM quantity; a selectable box 412 that permits the trader to select whether he or she prefers to have a public phase for the NIM order if the private phase does not result in a transaction; a first button 414 for sending a NIM bid; a second button 416 for sending a NIM offer; a third button 418 for canceling a NIM bid or offer; a fourth button 420 for accepting a NIM order; a fifth button 422 for rejecting a NIM order; a sixth button 424 for sending a NIM counteroffer; a timer field 426 displaying in FIG. 4A the amount of time to which the NIM private phase timer is set at the commencement of a NIM; and a status field 428 that displays NIM status to the trader (set to "Start negotiations" in FIG. 4A to indicate that the trader may start a NIM from this window).

In a preferred embodiment, where a trader has highlighted a displayed bid, field 406 preferably states "Send bid." Likewise, where the trader has highlighted a displayed offer, field 406 preferably states "Send offer." If the trader did not right-click on a bid or offer (e.g., he or she clicks elsewhere on the window), then all buttons are preferably inactive and field 406 shows an error message. If the trader did not right-click on the opposite side of the market from his or her pending bid or offer, field 406 is preferably displayed in red and states "Must right-click on counter party bid/offer price." To begin a NIM session, a trader preferably right-clicks on the counter party bid/offer price and selects "Negotiate." An icon may also be provided on the window for the security that, when selected, causes display of a NIM user interface window. In a preferred embodiment, all iterations of the NIM order windows are the same size, preferably as small as possible while remaining big enough for traders to read all of the text easily even during active trading.

Figure 4B:
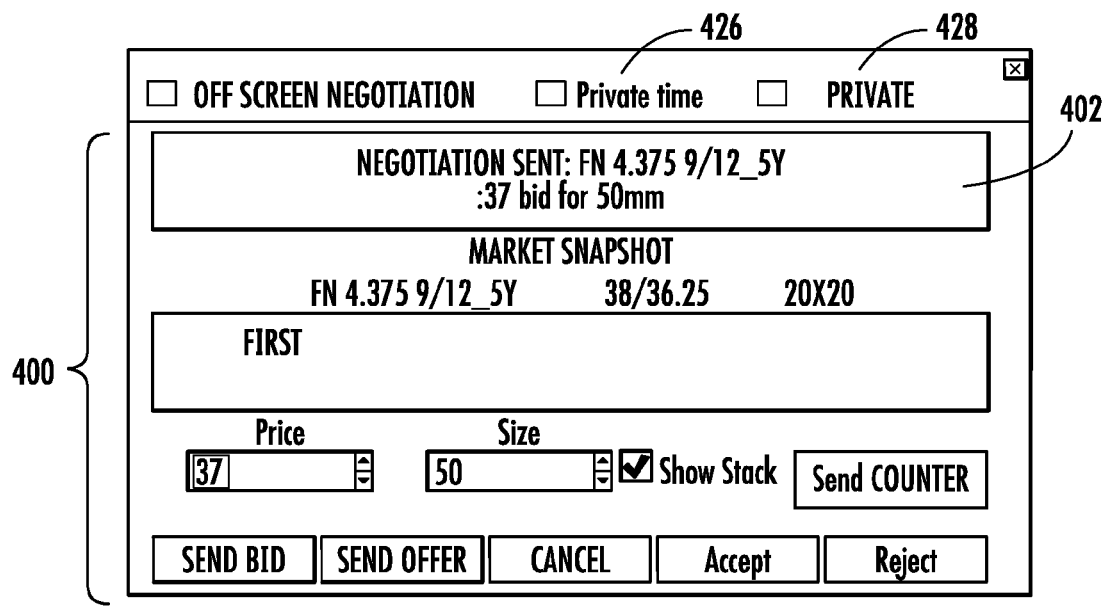

FIG. 4B shows a preferred embodiment of user interface window 400 where a trader has submitted a NIM initiation order. As shown in FIG. 4B, field 402 indicates that the trader has submitted a NIM initiation order for a quantity of 50 mm at a price of 37. In addition, status window 428 indicates that the NIM is in the private phase, and timer window 426 counts down the number of seconds remaining in the NIM private phase. The timer preferably resets each time a counteroffer is sent during the private phase of a NIM.

Figure 4C:
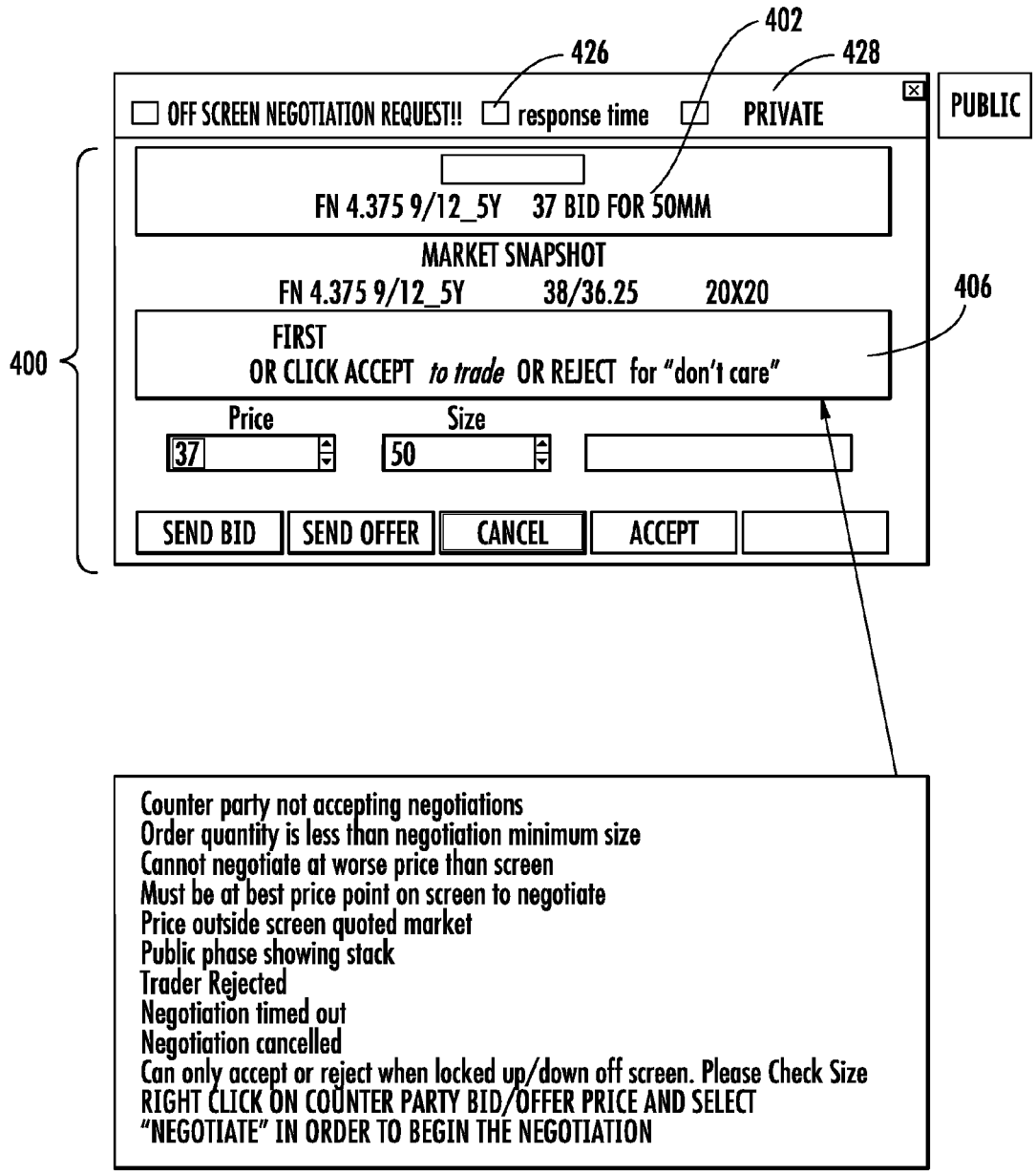

FIG. 4C shows a preferred embodiment of user interface 400 where a trader has received a NIM initiation order and may act on it. As shown in FIG. 4C, field 402 indicates that a trader is showing a NIM order for a quantity of 50 mm at a price of 37. Important words such as the word "showing" in field 402 are preferably highlighted and part of the title may blink slowly. Status field 428 indicates the current phase of the NIM. The private and public timers, represented by fields 426-428, may, e.g., be in yellow against a fixed blue background to ensure high visibility. Field 406 may preferably be used to show instructions and/or error messages, examples of which are listed in FIG. 4C. The error messages are preferably shown in the lower box so that traders can view the terms of the NIM without interruption. The color scheme of field 406 preferably changes only to convey error messages to the trader. Once the trader resolves the error, the field will return to the default color scheme.

Figure 4D:
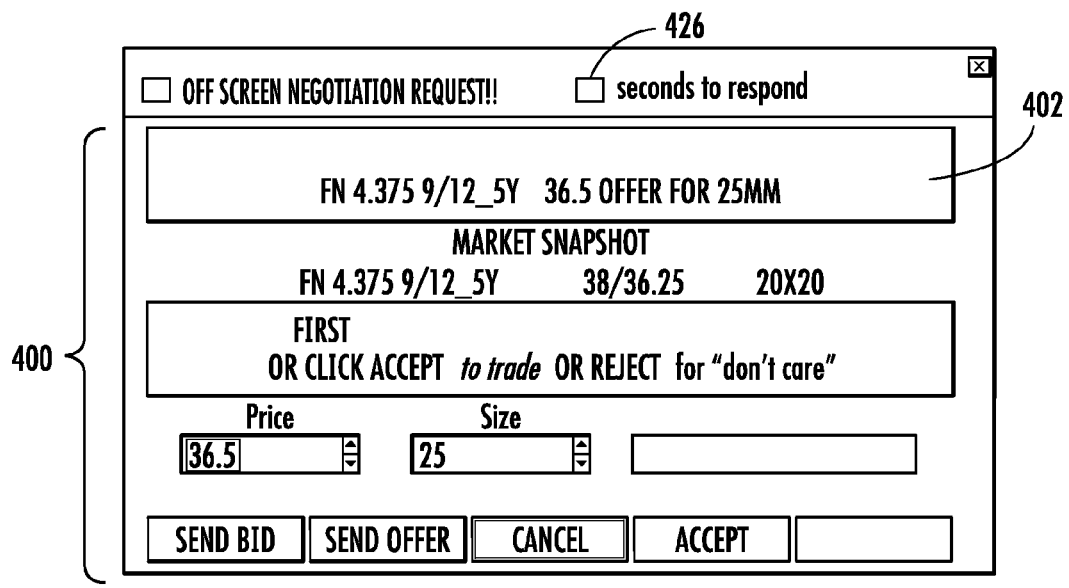

FIG. 4D shows a preferred embodiment of user interface 400 where a trader has received a NIM counteroffer order and may act on it. As shown in FIG. 4D, field 402 indicates that a trader has entered a NIM counteroffer order for 25 mm at a price of 36.5. The word "countering" in field 402 is preferably highlighted. Field 402 may change colors to reflect a change in status, but the background color is preferably chosen so that it never washes out the text. If a trader rejects a NIM initiation or counteroffer, then the counterparty preferably receives a response back stating "trader rejected" in field 402. If the sending trader cancels a NIM, the counterparty preferably receives a "Counterparty cancelled negotiation" message in field 402. Timer window 426 preferably indicates the number of seconds the trader has remaining to respond. The administrator that sets the timer may vary the amount of time allotted for the NIM depending on the product being traded. In the public phase, each trader in the stack that receives a NIM order preferably has a public timer counting down the number of seconds the trader has remaining to respond. If a trader is locked up or down off screen and can only accept, reject or ignore, the counter text in field 402 may preferably not be displayed. In an alternative embodiment, the counter text may be replaced with "Cannot counter if locked up/down."

Figure 5A:
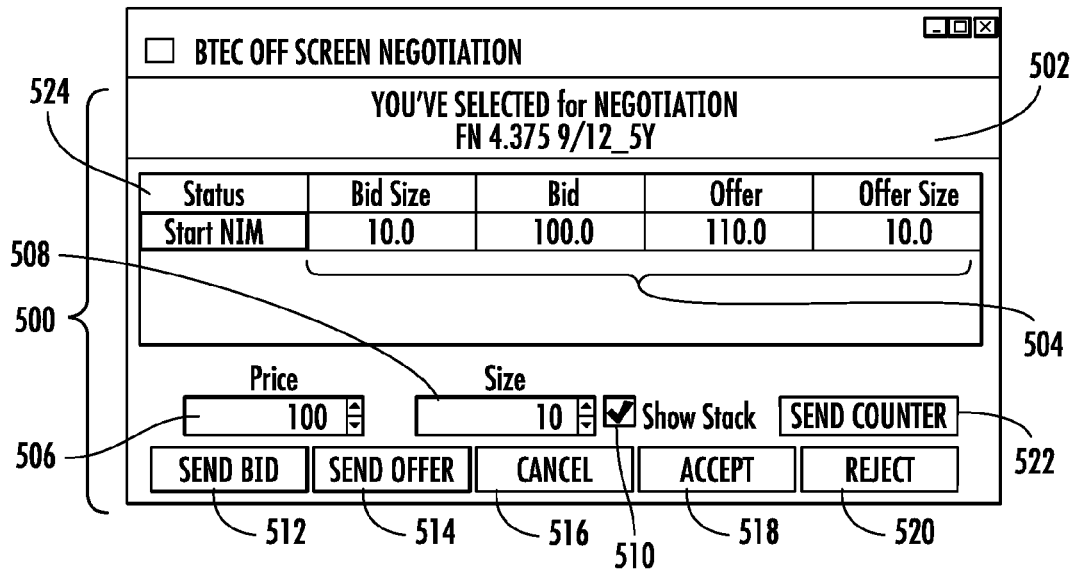
FIGS. 5A-D show preferred embodiments of further alternative user interface windows suitable for use in connection with NIM trading.

FIGS. 5A-D show preferred embodiments of further alternative user interface windows suitable for use in connection with NIM trading as described above. In particular, as shown in FIG. 5A, a user interface window 500 may comprise a first field 502 for displaying messages to the trader, e.g., a message that confirms to the trader that he or she has selected a particular instrument for NIM trading; a second field 504 that provides the trader a market snapshot for the selected instrument; a third field 506 that permits the trader to select a NIM price; a fourth field 508 that permits the trader to select a NIM quantity; a selectable box 510 that permits the trader to select whether he or she prefers to have a public phase for the NIM order if the private phase does not result in a transaction; a first button 512 for sending a NIM bid; a second button 514 for sending a NIM offer; a third button 516 for canceling a NIM bid or offer; a fourth button 518 for accepting a NIM order; a fifth button 520 for rejecting a NIM order; a sixth button 522 for sending a NIM counteroffer; and, a status field 524 that displays NIM status to the trader (set to "Start NIM" in FIG. 5A to indicate that the trader may start a NIM from this window).

Figure 5B:
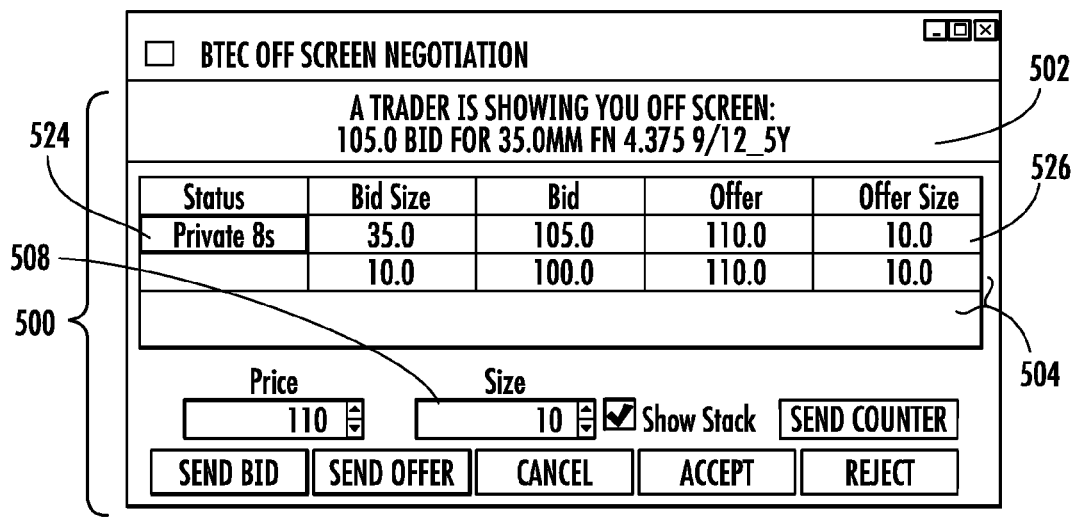

FIG. 5B shows a preferred embodiment of user interface window 500 where a trader has submitted a NIM initiation order. As shown in FIG. 5B, field 502 indicates that a trader has submitted a NIM initiation order for a quantity of 35 mm at a price of 105. Status window 524 indicates that the NIM is in the private phase and, in the present example, that 8 seconds remain in the private phase. In addition, the size and quantity of the NIM order are displayed in the shaded portion of a field 526, and the current market snapshot window 504 is shifted one row down and displayed in a grayed out form.

Figure 5C:
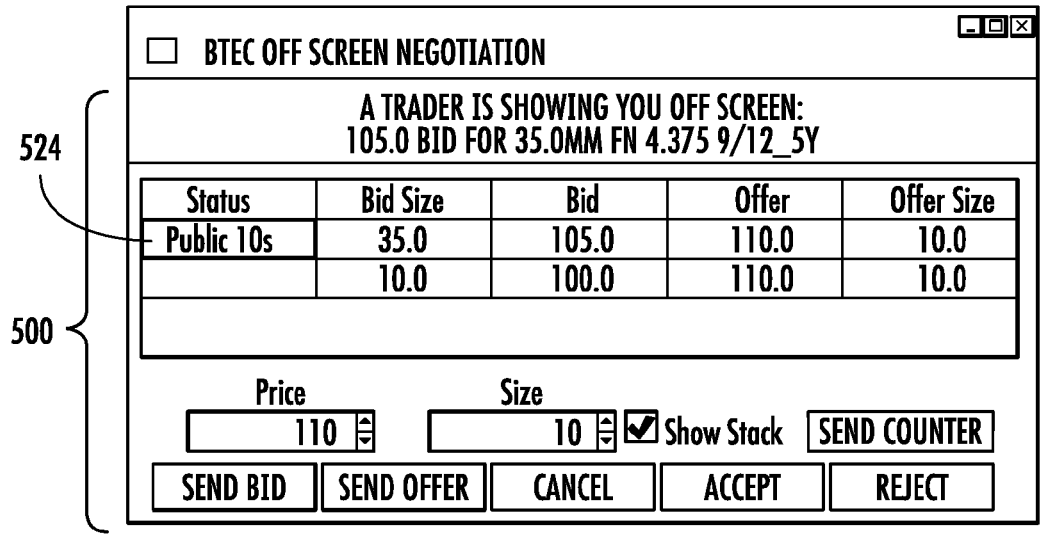

FIG. 5C shows a preferred embodiment of user interface window 500 where the NIM initiator elected to have a public phase for the NIM if the private phase did not result in a transaction. As shown in FIG. 5C, status window 524 indicates that the NIM is in the public phase and, in the present example, that 10 seconds remain in the public phase.

Figure 5D:
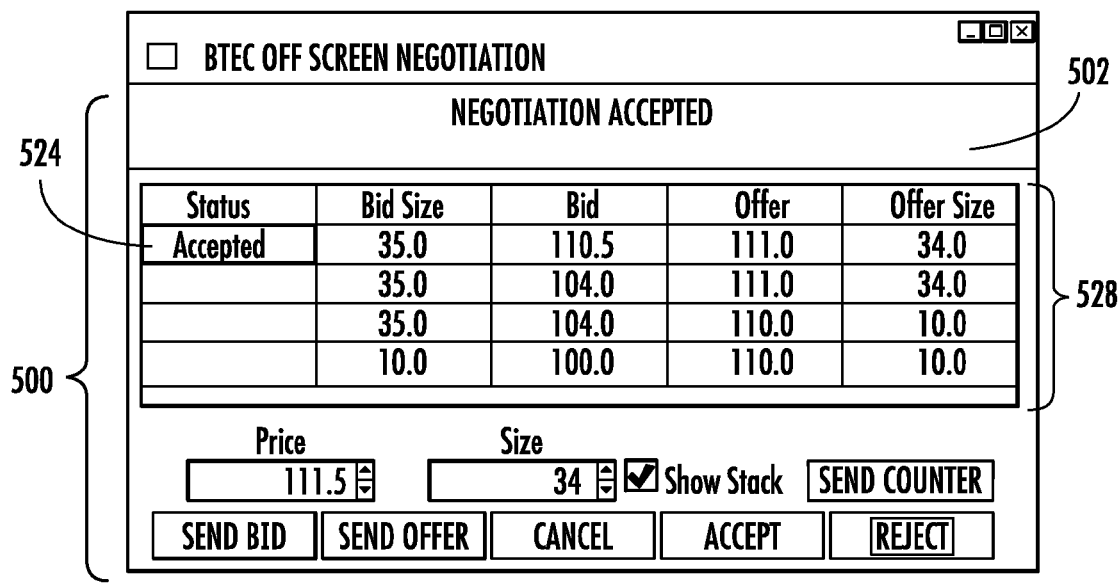

FIG. 5D shows a preferred embodiment of user interface window 500 where a NIM order is accepted. As shown in FIG. 5D, field 502 and status window 524 indicate that the NIM has been accepted. Field 528 summarizes the NIM orders submitted during the NIM and also shows the current market snapshot, which may preferably be updated on a real-time basis to reflect current market conditions.

While the present invention has been described in conjunction with specific embodiments, it is evident that numerous alternatives, modifications, and variations will be apparent to those skilled in the art in view of the foregoing description.

The invention claimed is:

1. A method of trading an item on a computerized trading system having a plurality of trading terminals and a matching engine connected by communication links, the plurality of trading terminals including a first trader trading terminal of a first trader and a first counterparty trading terminal of a first counterparty trader, the matching engine maintaining an order book of ranked orders for the item, the orders ranked according to price then time priority, and having a minimum pricing increment, the method having one or more phases of negotiation, the method comprising:

a private phase of negotiation, the private phase of negotiation comprising:

a) receiving, by the matching engine from the first trader trading terminal, a first order to buy or sell a quantity of the item from the first trader having a first quantity and at a first price in a spread between and including the best current price to buy and the best current price to sell the item in a market;

b) sending the first order from the matching engine only to the first counterparty trading terminal of the first counterparty trader having the highest ranked pending order, according to the price then time priority, in the order book on the opposite side of the market, for presentation of the first order on the first counterparty trading terminal;

c) receiving, by the matching engine from the first counterparty trading terminal, a response to the first order from the first counterparty trader, wherein the matching engine is configured to receive from the first counterparty trading terminal four types of responses to the first order comprising:

(i) acceptance of the first order, (ii) submission of a counteroffer order to buy or sell a quantity of the item from the first trader having a second quantity or at a second price in a spread between and including the best current price to buy and the best current price to sell the item in a market, (iii) rejection of the first order, and (iv) ignoring of the first order;

wherein, when the response is (i) acceptance of the first order, the matching engine executes a transaction between the first trader and the first counterparty trader at the first price and for the first quantity;

wherein, when the response is (iii) rejection of the first order or (iv) ignoring of the first order, the matching engine ends the private phase of negotiation and determines whether to proceed to a public phase of negotiation; and wherein, when the response is (ii) submission of the counteroffer order, the matching engine sends the counteroffer order to the first trader trading terminal for presentation of the counteroffer order on the first trader trading terminal; and receives from the first trader trading terminal, a response to the counteroffer order from the first trader, wherein the matching engine is configured to receive from the first trader trading terminal four types of responses to the counteroffer order comprising:

(v) acceptance of the counteroffer order, (vi) submission of a further counteroffer order to buy or sell a quantity of the item from the first counterparty trader having a third quantity or at a third price in a spread between and including the best current price to buy and the best current price to sell the item in a market, (vii) rejection of the counteroffer order, and (viii) ignoring of the counteroffer order, wherein the determination as to whether to proceed to the public phase of negotiation is a function of whether a last order submitted during the private phase of negotiation was submitted by the first trader or by the counterparty trader.

2. The method of claim 1, wherein the determination as to whether to proceed to the public phase of negotiation is a function of whether the first trader has indicated a preference for the public phase of negotiation.

3. The method of claim 1, wherein the minimum pricing increment applied to the ranked orders is larger than a minimum pricing increment applied to orders during the private phase of negotiation.

4. The method of claim 1, further comprising starting a first clock when the first order to buy or sell a quantity of the item from the first trader at the first price in a spread between and including the best current price to buy and the best current price to sell the item in a market is received and, where the response is a counteroffer order, resetting the first clock when the counteroffer order is provided to the first trader, where the response is acceptance of the first order or a rejection of the first order, stopping the first clock, and wherein ignoring of the first order comprises the first counterparty trader ignoring the first order until the first clock has expired.

5. The method of claim 1, wherein the step of sending the first order only to the first counterparty trading terminal comprises sending the first order for presentation of the first order on a negotiation screen that is confidential with respect to the rest of the market.

6. The method of claim 1, wherein the plurality of trading terminals includes one or more counterparty trading terminals of one or more counterparty traders, the method further comprising the public phase of negotiation if it is determined to proceed to the public phase of negotiation, the public phase of negotiation comprising:

sending a second order from the matching engine to the one or more counterparty trading terminals, the counterparty traders having the highest ranked pending orders in respect of price in the order book on the opposite side of the market, wherein (a) the second order specifies the same first price and first quantity as the first order, where the first counterparty trader made no counteroffer order during the private phase of negotiation, and (b) the second order specifies the same price and quantity as the most recent counteroffer order submitted during the private phase of negotiation, where either the first trader or the first counterparty trader or both the first trader and the first counterparty trader made one or more counteroffer orders during the private phase of negotiation;

receiving, at the matching engine from the one or more counterparty trading terminals, a response to the second order from the one or more of the counterparty traders, wherein the matching engine is configured to receive from each of the one or more counterparty trading terminals three types of responses to the second order comprising:

acceptance of the second order, rejection of the second order, and ignoring of the second order;

wherein, when the response is acceptance of the second order, the matching engine executes a transaction between the first trader and the quickest counterparty trader among the one or more counterparty traders to respond with acceptance of the second order at the price and for the quantity specified in the second order; and wherein, when the response is a rejection of the second order or ignoring of the second order by all of the one or more counterparty traders, the matching engine ends the public phase of negotiation.

7. The method of claim 6, further comprising starting a second clock when the second order is presented to the one or more counterparty traders and, where the response is acceptance of the second order or a rejection of the second order by all the counterparty traders, stopping the second clock, and wherein ignoring of the second order comprises all the counterparty traders ignoring the second order until the second clock has expired.

\* \* \* \* \*